US007334305B2

(12) United States Patent
Hadayia, Jr. et al.

(10) Patent No.: US 7,334,305 B2
(45) Date of Patent: Feb. 26, 2008

(54) BEARING AND SEAL INSTALLATION DEVICE AND METHOD

(75) Inventors: Charlie Hadayia, Jr., Richland Center, WI (US); Jason Andrew Thurow, Wilton, WI (US); Justin Bramstedt, Viroqua, WI (US); James Egizio, North Riverside, IL (US)

(73) Assignee: S&S Cycle, Inc., Viola, WI (US)

( * ) Notice: Subject to any disclaimer, the term of this patent is extended or adjusted under 35 U.S.C. 154(b) by 550 days.

(21) Appl. No.: 10/735,796

(22) Filed: Dec. 12, 2003

(65) Prior Publication Data

US 2005/0126000 A1 Jun. 16, 2005

(51) Int. Cl.
*B23P 11/00* (2006.01)

(52) U.S. Cl. ........................................................ 29/256

(58) Field of Classification Search .......... 29/255-268, 29/270, 278, 888.01; 254/102, 100, 89 R
See application file for complete search history.

(56) References Cited

U.S. PATENT DOCUMENTS

| | | | | |
|---|---|---|---|---|
| 2,802,388 | A * | 8/1957 | Luckenbach | 84/459 |
| 4,279,553 | A * | 7/1981 | Cleary | 408/135 |
| 4,443,000 | A * | 4/1984 | Harvard | 254/89 R |
| 4,551,898 | A | 11/1985 | Provost | |
| 4,609,179 | A * | 9/1986 | Chern et al. | 254/102 |
| 5,033,177 | A | 7/1991 | Gathright et al. | |
| 5,355,572 | A | 10/1994 | Kammeraad et al. | |
| 5,535,514 | A * | 7/1996 | Lucas | 29/888.06 |
| 5,539,979 | A | 7/1996 | Powers | |
| 6,349,459 | B1 | 2/2002 | Dean | |
| 6,543,117 | B1 * | 4/2003 | Claycomb et al. | 29/426.4 |
| 6,571,819 | B1 | 6/2003 | Capoferi | |
| 6,775,890 | B2 * | 8/2004 | Kolarik | 29/235 |
| 2005/0126000 | A1 * | 6/2005 | Hadayia et al. | 29/888.01 |

OTHER PUBLICATIONS

Catalogue; Dec. 2, 2003; pp. 162-165.

* cited by examiner

*Primary Examiner*—Lee D. Wilson
(74) *Attorney, Agent, or Firm*—Steptoe & Johnson

(57) ABSTRACT

An installation device and method for installing engine components, such as bearings and seals, on an engine. The device including a first connection member that couples to an engine and a second moveable member configured to translate relative to the first connection member. The device also includes a rack and pinion arrangement that provides translation of the second moveable member relative to the first connection member.

15 Claims, 7 Drawing Sheets

BEARING AND SEAL INSTALLATION DEVICE AND METHOD

TECHNICAL FIELD

This disclosure relates generally to methods and devices for use with engine repair, assembly, and maintenance. More particularly, this disclosure relates to a device for installing components, such as bearings and seals on an engine, and related methods of installation.

BACKGROUND

Engines include a number of close tolerance components. During assembly and repair or maintenance, properly fitting the components in relation to one another can be critical. Such components include engine bearings and engine seals. Installation of engine bearings and seals is slow and tedious.

In general, improvement has been sought with respect to such devices and methods, generally to better accommodate: ease and precision of bearing and seal installation, improved time efficiency in engine bearing and seal installation procedures, and, adaptability for use in a variety of installation applications.

SUMMARY

In one aspect, the invention relates to a device for installing an engine component on an engine. The device includes a first member configured to couple to the engine, a second member interconnected to the first member, and a rack and pinion arrangement. The first and second members are coaxially aligned and defining a longitudinal axis. The rack and pinion arrangement provides movement of the second member relative to the first member.

In another aspect, the invention relates to a method of installing an engine component on an engine. The method includes placing an engine component adjacent to an installation location of the engine and coupling a first member of an installation device to the engine. The method further includes seating the placed engine component at the installation location by rotating a gear of a rack and pinion arrangement to translate a second member and the engine component relative to the first member.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
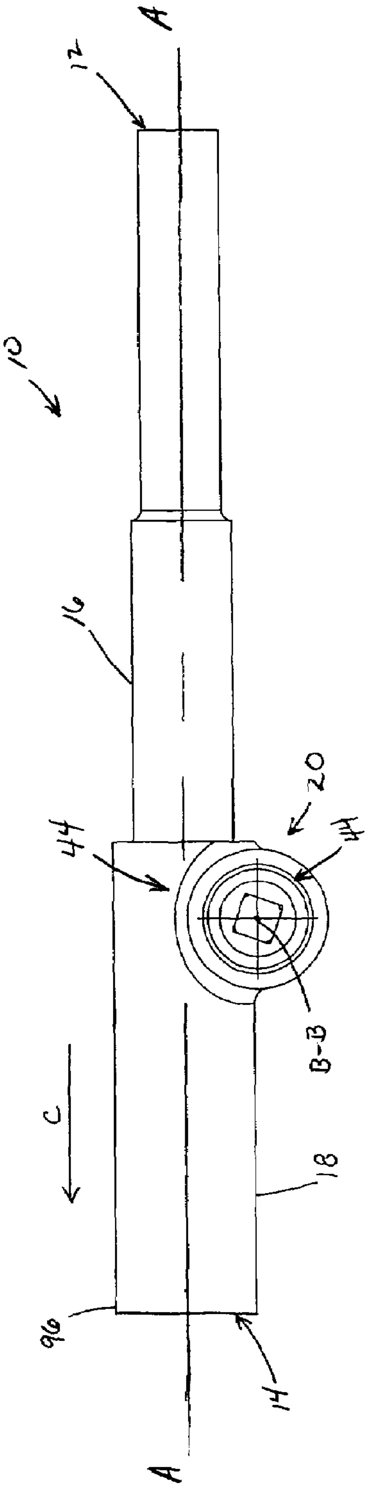
FIG. 1 is a side elevational view of an installation device, according to the principles of the present disclosure.

FIG. 1 illustrates an installation device 10 for use in installing engine components, such as bearings or engine seals, on an engine. The installation device 10 includes features that are examples of how inventive aspects in accordance with the principles of the present disclosure may be practiced.

Figure 3:
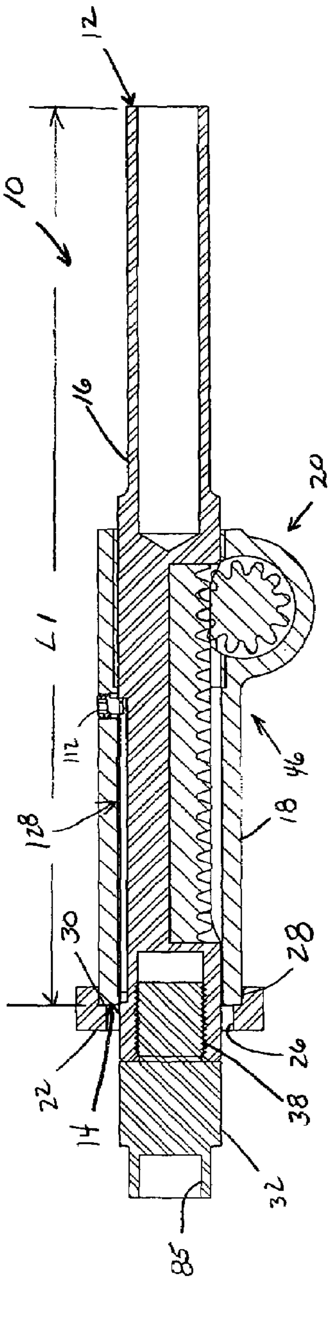
FIG. 3 is a cross-sectional view of the installation device of FIG. 1, shown in a first position and including the adapter and one of the seal installers.
Figure 4:
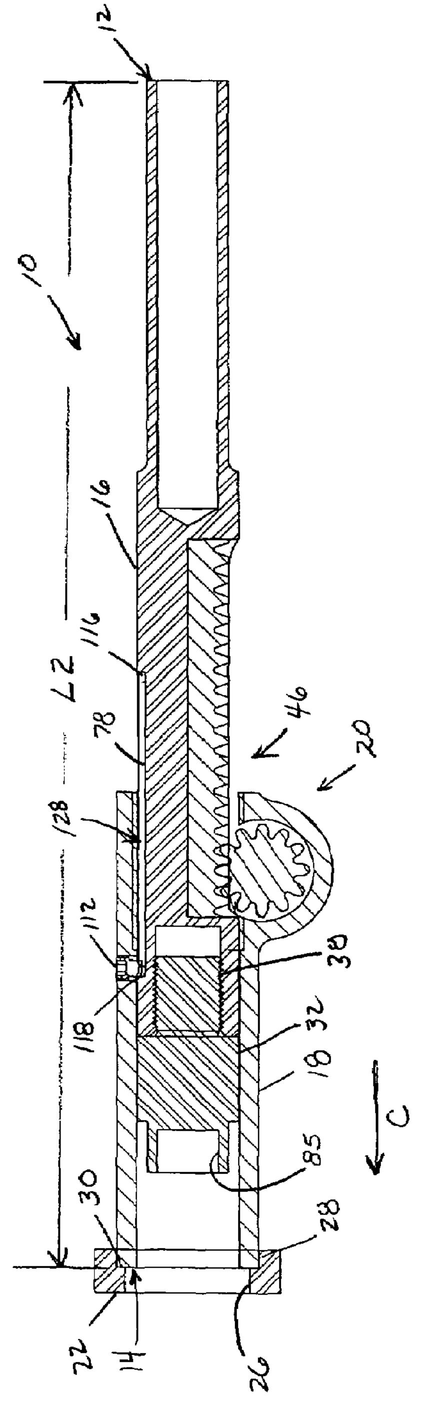
FIG. 4 is a cross-sectional view of the installation device of FIG. 3, shown in a second position.

The installation device 10 is generally elongated and has a longitudinal axis A-A extending from a first end 12 to a second end 14. The illustrated installation device 10 includes a first connection member 16, a second moveable member 18 and a translation arrangement 20. The second moveable member 18 is configured to linearly translate relative to the first connection member 16. In particular, the translation arrangement 20 is configured to provide non-rotational, linear translation of the second moveable member 18 between a first, non-translated position and a second, translated position. FIG. 3 illustrates the installation device 10 in the first non-translated position. FIG. 4 illustrates the installation device 10 in the second translated position.

In general, the installation device 10 has a non-translated length L1 when positioned as shown in FIG. 3 and a translated length L2 when positioned as shown in FIG. 4; although the disclosed principles can be applied in a variety of sizes and applications. Each of the lengths L1, L2 is defined between the first end 12 and the second end 14 of the device. The non-translated length L1 of the installation device is preferably between 8.0 and 15.0 inches; more preferably between 11.0 and 12.0 inches. The fully translated length L2 of the installation device 10 is preferably between 10.0 and 20.0 inches; more preferably between 13.5 and 16.5 inches. Accordingly the installation device 10 has a preferred maximum travel length (the difference between L1 and L2) of about 2.0 and 5.0 inches; more preferably about 2.5 to 4.5 inches. As can be understood, the device may be translated to a variety of intermediate lengths between the non-translated length L1 and the fully translated length L2.

Figure 2:
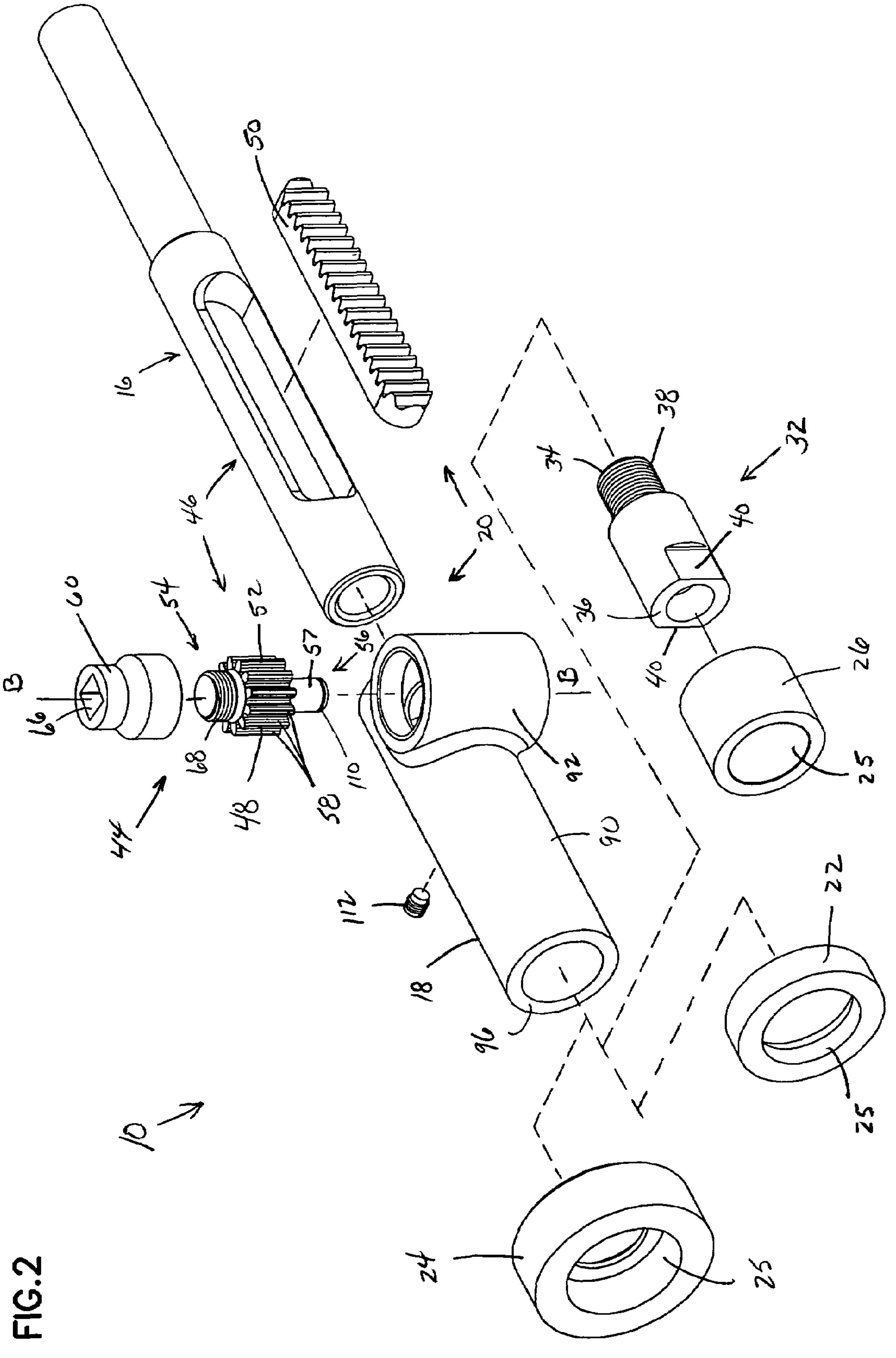
FIG. 2 is an exploded perspective view of the installation device of FIG. 1, further showing an adapter, first and second seal installers, and a bearing installer, according to the principles of the present disclosure.

Referring now to FIG. 2, the translation arrangement 20 of the illustrated embodiment includes a rotational engagement structure 44 that provides the linear translation of the second moveable member 18 relative to the first connection member 16. In particular, the rotational engagement structure 44 provides linear translation of the second moveable member 18 relative to the first connection member 16 when the rotational engagement structure 44 is rotated. In the illustrated embodiment, the rotational engagement structure 44 is rotated about an axis B-B (FIGS. 1 and 2) that is perpendicular to the direction of translation C (the direction of translation C being coaxially aligned with the longitudinal axis A-A of the installation device 10).

Still referring to FIG. 2, the rotational engagement structure 44 of the translation arrangement 20 includes a rack and pinion arrangement 46. The rack and pinion arrangement 46 includes a pinion gear 48 positioned to engage a rack 50. Linear translation of the second moveable member 18 relative to the connection member 16 is accomplished by rotating or turning the pinion gear 48 about the axis B-B.

Figure 13:
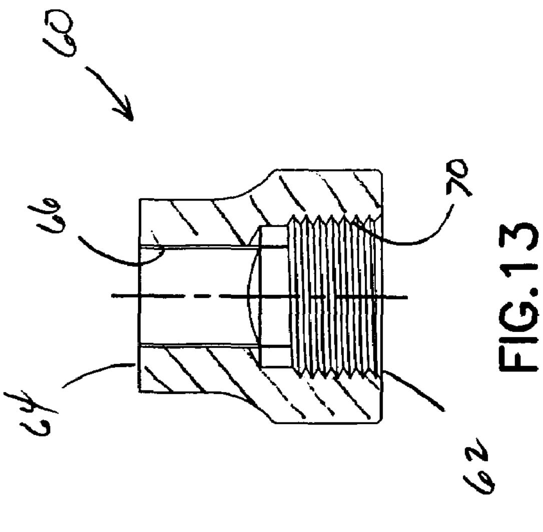
FIG. 13 is a cross-sectional view of a socket attachment shown in FIG. 2.

The pinion gear 48 includes a gear portion 52 having teeth 58. The gear portion 52 is located between a first end 54 and a second end 56. The second end 56 defines a gear shaft 57. The first end 54 has threads 68 that connect to a cap 60. The cap 60, as shown in FIG. 13, has corresponding threads 70 on one end 62 and a socket attachment 66 located at the other end 64. The cap 60 is constructed so that a user can easily attach a common socket wrench to the socket attachment 66 to rotate the pinion gear 48 during an installation procedure. As can be understood, other types of tool attachments, such as a breaker bar or wrench, can be used to provide rotation to the gear 48 and thereby linearly translate the second moveable member 18 relative to the first connection member 16.

Figure 5:
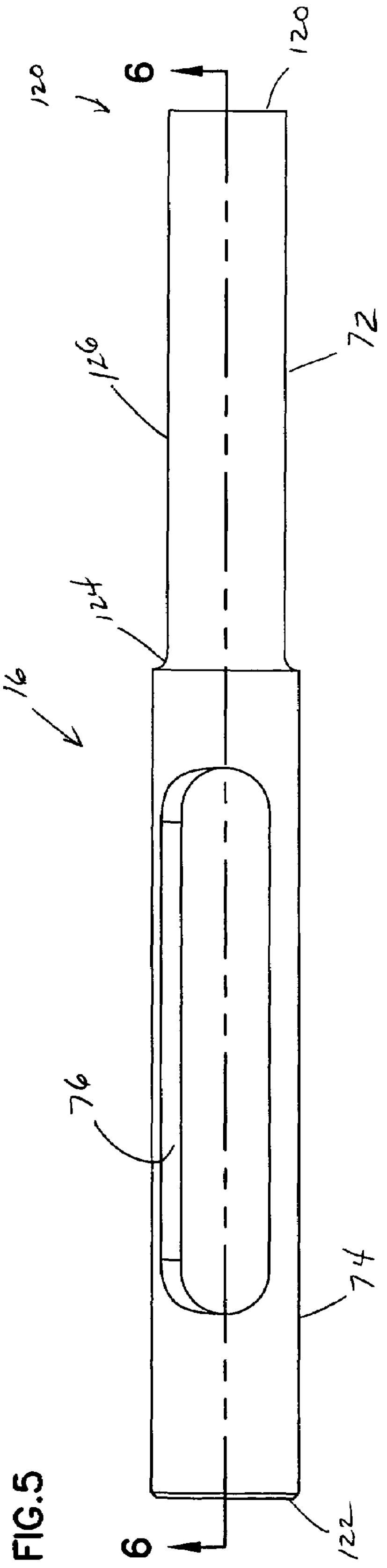
FIG. 5 is a side elevational view of a connection member of the installation device shown in FIG. 1.
Figure 6:
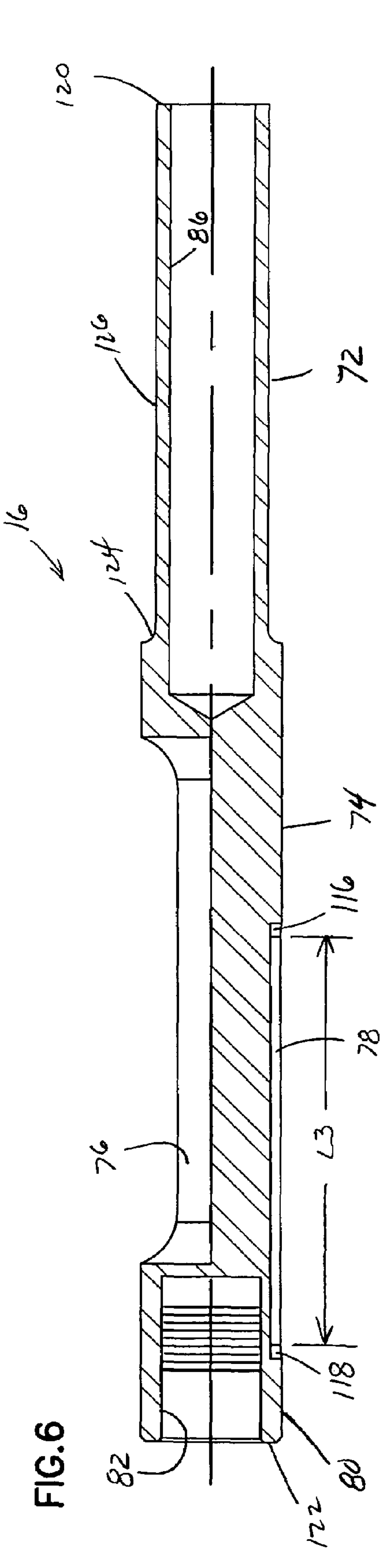
FIG. 6 is a cross-sectional view of the connection member of FIG. 5.

Referring now to FIGS. 5 and 6, the first connection member 16 generally includes a first end 120 and a second end 122. A tapered region 124 is located between the first and second ends 120, 122 of the connection member 16. The taper region 124 essentially defines a first shaft portion 72 that extends outward from a second shaft portion 74.

In the illustrated embodiment, the first and second shaft portions 72, 74 have different diameters; although in alternative embodiments, the diameters may be the same. To reduce the overall weight of the illustrated device 10, the diameter of the first shaft portion 72 is less than that of the second shaft portion 74. In addition, the first shaft portion 72 includes a bore 86 provided for further weight reduction. As can be understood, the device 10 may be used without the bore 86, or include other weight and/or cost reduction configurations, formed in the connection member 16.

In use, the first shaft portion 72 generally defines a handle 126 for manipulating the installation device 10. In an alternative embodiment, the handle may be a separate piece that detachably interconnects to the second shaft portion 74.

Still referring to FIGS. 5 and 6, the second shaft portion 74 of the connection member 16 defines a first slot 76 and a second slot 78. The first and second slots 76, 78 are oriented approximately 90 degrees relative to one another although the second slot 78 may be located in other orientations relative to the first slot 76 in accord with the principles disclosed. The first slot 76 is configured for receipt of the rack 50 of the rack and pinion arrangement 46.

The second shaft portion 74 of the connection member 16 also includes a construction 80 configured to couple to an engine, e.g. an end of a crankshaft, for example. The construction 80 maintains the first connection member 16 in a fixed position relative to the engine. As can be understood, the connection between the first connection member 16 and the crankshaft or other component of the engine can be accomplished in a variety of ways and include, for example, a variety of connection types. In the illustrated embodiment the construction 80 is an internal thread connection 82.

Figure 8:
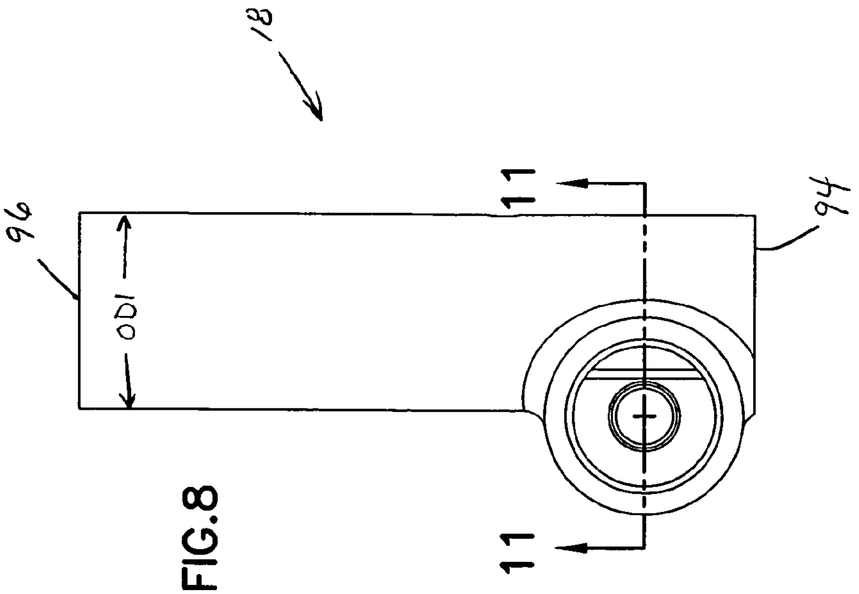
FIG. 8 is a top plan view of the housing of FIG. 7.
Figure 7:
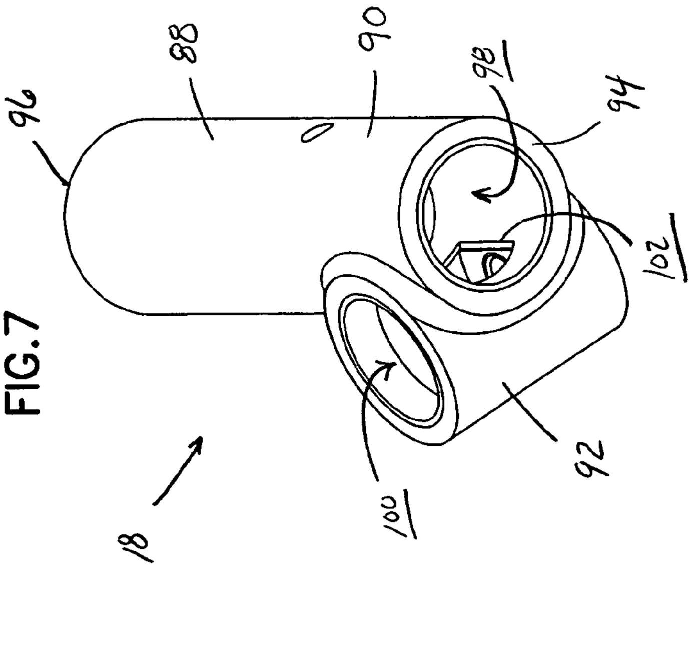
FIG. 7 is a rear perspective view of a housing of the installation device shown in FIG. 1.

Referring now to FIGS. 7 and 8, the second moveable member 18 generally defines a housing 88 configured to receive the first connection member 16. The housing 88 includes a first main housing portion 90 and a second gear housing portion 92. The main housing portion 90 has a first end 94 and a second end 96. A central bore 98 extends through the main housing portion 90 from the first end 94 to the second end 96. The second shaft portion 74 of the connection member 16 is slidably received within the central bore 98 of the main housing portion 90.

Figure 11:
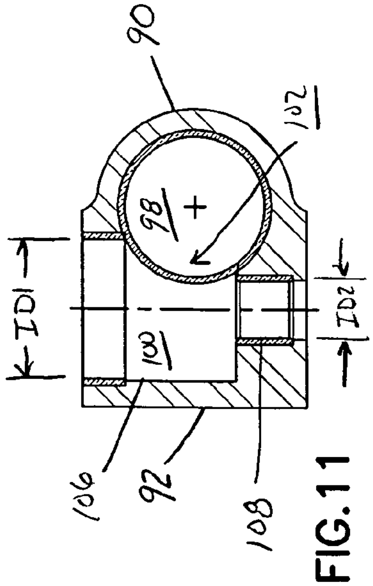
FIG. 11 is a cross-sectional view of the housing of FIG. 8, taken along line 11-11.
Figure 9:
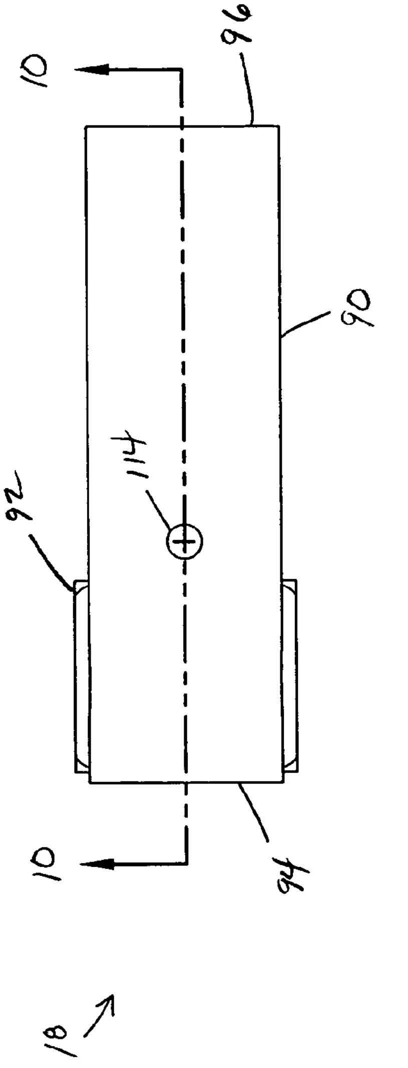
FIG. 9 is a side elevational view of the housing of FIG. 7.

The gear housing portion 92 of the moveable member 18 is configured for receipt of the pinion gear 48 (FIG. 2) of the rack and pinion arrangement 46. As shown in FIG. 11, the gear housing portion 92 includes a bore 100 oriented generally perpendicular to the central bore 98. The gear housing bore 100 is sized to extend into the central bore 98 of the main housing portion 90 (FIG. 11). That is, an opening 102 (FIG. 7) is provided between the bore 100 of the gear housing portion 92 and the central bore 98 of the main housing portion 90. When the pinion gear 48 is placed within the gear housing portion 92, the teeth 58 of the pinion gear 48 extend through the opening 102 into the central bore 98 of the main housing portion 90. The teeth 58 of the pinion gear 48 engage the rack 50 located within the first slot 76 of the connection member 16 when the connection member 16 is positioned within the central bore 98 of the main housing portion (FIGS. 3 and 4).

Referring to FIG. 11, the bore 100 of the gear housing portion 92 includes a first bore portion 106 having a first inner diameter ID1 that is greater than a second inner diameter ID2 of a second bore portion 108. When assembled, the gear portion 52 of the pinion gear 48 is positioned within the first bore portion 106 and the gear shaft 57 of the pinion gear is positioned within the second bore portion 108 of the gear housing 92. As shown in FIG. 2, the pinion gear 48 includes a groove 110 configured for receipt of a snap ring (not shown). The snap ring and groove 110 retains the pinion gear 48 in relation to the gear housing portion 92. It is contemplated that other types of fastening arrangements known to those skilled in the art may be utilized for securing the pinion gear in relation to the gear housing portion 92.

Referring back to FIGS. 3 and 4, the installation device is configured generally such that the second moveable member 18 linearly translates relative to the first connection member 16. The installation device 10 also includes a stop arrangement 128 that limits the movement of the second member 18 relative to the first member 16 between the non-translated position and the fully translated position. In the illustrated embodiment, the stop arrangement 128 is defined by a set screw 112 (FIG. 2) operably positioned in relation to the second slot 78 formed within the connection member 16.

Figure 10:
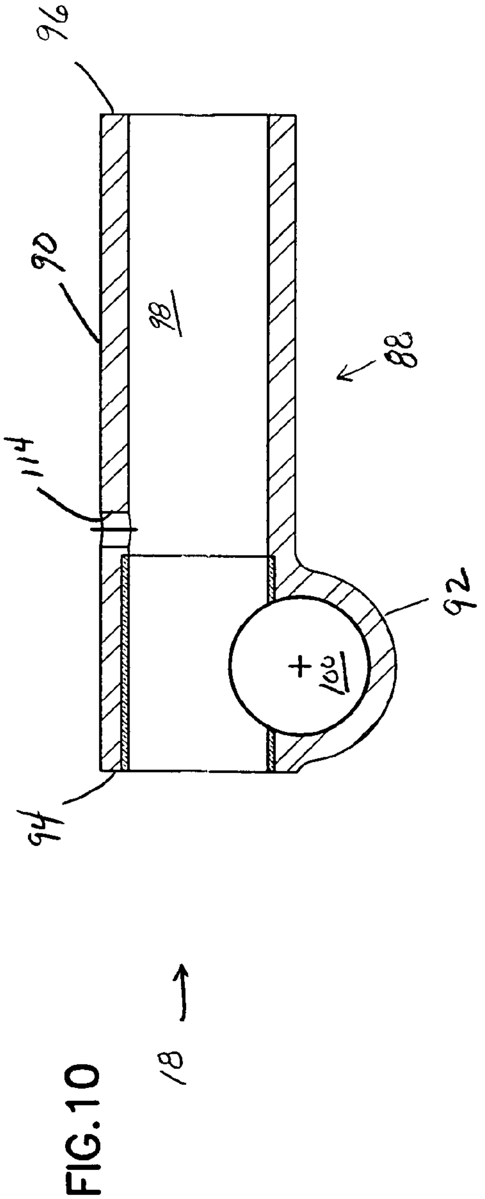
FIG. 10 is a cross-sectional view of the housing of FIG. 9, taken along line 10-10.

The set screw 112 is engaged within a threaded hole 114 (FIG. 10) formed in the main housing portion 90. During translation from the non-translated position to the translated position, the set screw 112 rides with the second slot 78 (FIG. 6) of the first connection member 16 without interference. Ends 116, 118 (FIGS. 4 and 6) of the second slot 78 provide a positive stop to define the non-translated position and the fully translated position. Accordingly the length L3 (FIG. 6) of the slot 78 generally defines the maximum travel length (the difference between L1 and L2) of the installation device 10. Other arrangements, such as pins or shoulder stops formed or secured to the device, that limit the relational travel between the connection member 16 and the moveable member 18 may be used.

As previously noted, although the device of FIG. 4 is shown in a fully translated position, the device may be used to install engine components to a depth corresponding to a desired translated position less than that of the fully translated position. Accordingly, in some embodiments, the installation device 10 may include marking (not shown) to denote the length of translation of the moveable member 18 (or the depth of insertion of an engine component). The markings may be, for example, located on the fixed connection member 16 so that as the moveable member 18 translates, information corresponding to the length of travel or depth of insertion is revealed to the user.

Figure 14:
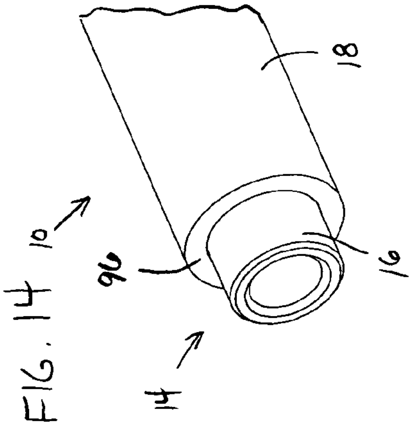
FIG. 14 is a partial perspective view of the installation device of FIG. 1, configured for use with a first component.

Referring now to FIGS. 1 and 14, the installation device 10 is generally configured to "correspond" to the engine component being installed. In particular, the second end 96 of the moveable member 18 is sized and configured to contact the engine component in such a manner as to apply a uniform force on the engine component to properly install the component without damage. Damage, which can reduce the life of the component, or even result in immediate component failure, is often caused by improper alignment or improper installed location and/or non-uniform installation force resulting in component distortion.

In the illustrated embodiment of FIGS. 1 and 14, the second end 96 of the moveable member may be used to install an engine component such as a bearing on a "Big Twin" motorcycle engine, for example. In the alternative, installer pieces and/or adapters may be used to adapt the installation device 10 for use with other types of engine components. FIG. 2 illustrates some embodiments of installer pieces, including first, second, and third installer pieces, 22, 24, and 26, and an adapter 32 that can be used in accord with the principles disclosed.

Each of the installer pieces 22, 24, 26 are sized and configured to "correspond" to a particular type of engine component. The adapter 32 is configured to provide an engine connection other than that provided by the connection member 16 (e.g., the adapter provides a connection to couple to a crankshaft having a different threaded connection than that of a "Big Twin" engine). As can be understood, installer pieces and adapters can include a variety of configurations corresponding to a variety of engine components. Preferably, each of the installer pieces and alternative adapters are selectively interchangeable and mountable to the device 10 so that the device may be used in a variety of applications.

Figure 12:
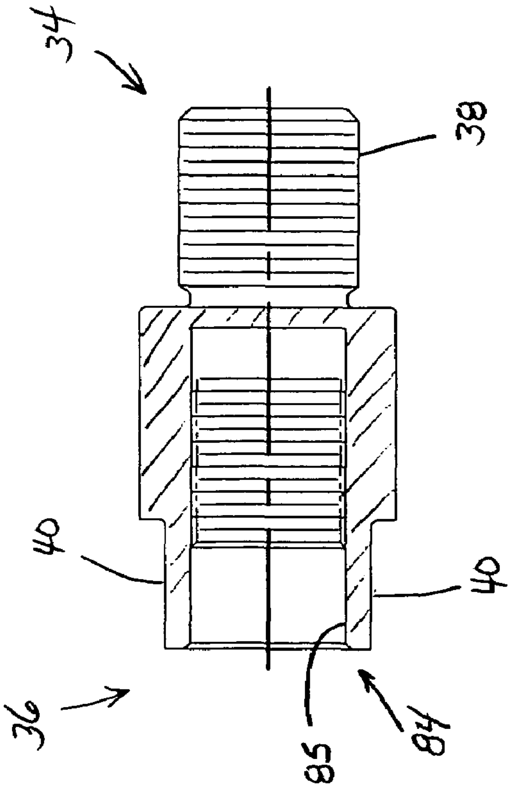
FIG. 12 is a cross-sectional view of an adapter shown in FIG. 2.

Referring to FIG. 12, the adapter 32 has a first end 34 and a second end 36. The first end 34 is an externally threaded end 38 that connects to the internal thread connection 82 of the first connection member 16. Accordingly, the adapter 32 includes a construction 84 configured to couple to the engine. The construction 84 fixes the first connection member 16 in relation to the engine. In the illustrated embodiment, the construction 84 includes a threaded adapter connection 85 that is different than the internal thread connection 82 of the first connection member 16. The adapter permits a user to utilize the installation device 10 in an application having a different engine connection configuration.

Referring again to FIG. 2, the second end 36 of the adapter 32 also includes flats 40. The flats 40 are located on the outer diameter of the adapter 32. The flats 40 are provided so that a user can apply a wrench to the adapter 32 for removal from the connection member 16 after an installation procedure is complete.

Figure 15:
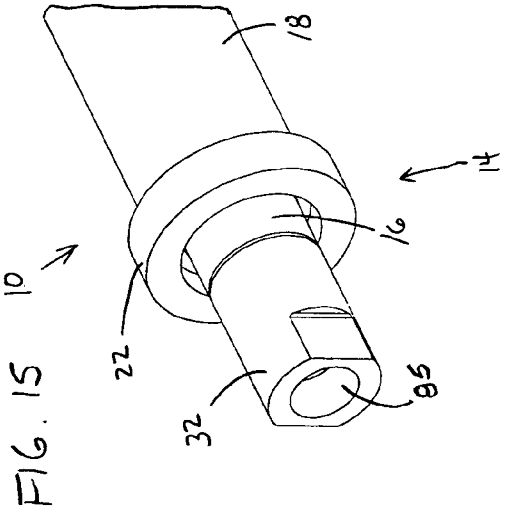
FIG. 15 is a partial perspective view of the installation device of FIG. 1, configured for use with a second component.

Referring to FIGS. 3, 4, and 15, the first installer piece 22 is configured to mount to the second end 14 of the installation device 10. The installer piece 22 in combination with the adapter 32 may be used to install an engine component such as an engine seal on a "Sportster" motorcycle engine, for example.

Figure 16:
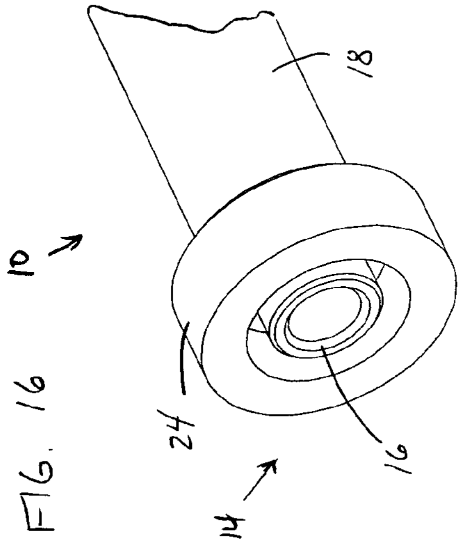
FIG. 16 is a partial perspective view of the installation device of FIG. 1, configured for use with a third component.

Referring now to FIGS. 2 and 16, the second installer piece 24 is also configured to mount to the second end 14 of the installation device 10. The second installer piece 24 may be used to install another type of engine seal component on a different motorcycle engine, such as a "Big Twin" motorcycle engine, for example. In this particular application, the adapter 32 is not used.

Figure 17:
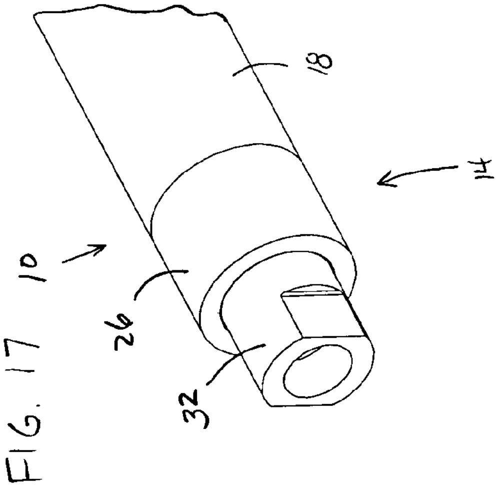
FIG. 17 is a partial perspective view of the installation device of FIG. 1, configured for use with a fourth component.

Referring now to FIGS. 2 and 17, the third installer piece 26 in combination with the adapter 32 may be used to install an engine component such as a bearing on a "Sportster" motorcycle engine, for example. As shown in FIG. 17, the third installer piece has a diameter that is generally the same as the moveable member 18; however, the third installer piece 26, in combination with the adapter 32, is used with an engine connection configuration that is different than the connection dictated by the internal thread connection 82 of the connection member 16. For this application, the third installer piece 26 is used to essentially maintain the maximum travel provided by the installation device 10. That is, the overall length of the first connection member 16 increases when the adapter 32 is interconnected to the connection member 16. To accommodate the increase in length of the connection member 16, the installer piece 26 is mounted to the moveable member 18 to correspondingly increase the overall length of the moveable member 18.

Each of the first, second and third installer pieces 22, 24, 36 includes a central bore 25 (FIG. 2). As shown in FIGS. 2 and 3, the first and second installer pieces (22 shown, 24) each include a counterbore 28. The counterbore 28 is sized to properly locate and mount the installer pieces 22, 24 on the second end 14, i.e. the outer diameter, of the device 10. When using the third installer piece 26, the outer diameter of the adapter 32 assists in properly locating the installer piece 26 relative to the second end 14 of the device 14.

In use, an engine component is placed or located at an installation site; for example, a bearing or seal is placed about a crankshaft. The first connection member 16 is then coupled to the crankshaft. In particular, the internal thread connection 82 is threaded to the crankshaft to maintain the connection member 16 in a fixed relation to the engine. In an alternative application, one of the installer pieces 22, 24, 26 corresponding to the bearing or seal may be positioned on the second end 14 of the installation device, i.e. the second end 96 of the moveable member 18; and the adapter 32 may be threaded to the internal thread connection 82 of the connection member 16. The threaded adapter connection 85 of the adapter 32 is then coupled to the crankshaft to maintain the connection member 16 in a fixed relation to the engine.

At this point, the installation device is in the non-translated position as shown in FIG. 3. The pinion gear 48 is then rotated by, for example, a common socket wrench attached to the cap 60. As the pinion gear 48 rotates, the translation arrangement 20 translates the torsional input of the socket wrench/pinion gear into linear movement. In particular, the pinion gear 48 engages and rides along the rack 50 of the translation arrangement in the direction of translation (represented by arrow C in FIG. 4). Installation of the bearing or seal is accomplished by translating the moveable member 18, and the engine component, relative to the connection member 16 until the component is seated at a desired depth.

The above specification provides a complete description of the BEARING AND SEAL INSTALLATION DEVICE AND METHOD. Since many embodiments of the invention can be made without departing from the spirit and scope of the invention, certain aspects of the invention reside in the claims hereinafter appended.

What is claimed is:

1. A device for installing engine components on an engine, the device comprising:

a first member configured to couple to the engine;

a second member interconnected to the first member, the first and second members being coaxially aligned and defining a longitudinal axis, the second member being configured to move relative to the first member along the longitudinal axis;

a rack and pinion arrangement that provides movement of the second member relative to the first member, the rack and pinion arrangement including a gear arranged to engage a rack to provide linear translation of the second member relative to the first member; and a cap coupled to the gear, the cap including a socket wrench attachment, wherein the gear is coupled to the second member, and wherein rotation of the gear provides linear translation of the second member relative to the first member.

2. The device of claim 1, wherein the rack is positioned within a slot formed in the first member.

3. The device of claim 1, further including a stop arrangement that limits the movement of the second member relative to the first member, the movement being limited between a non-translated position and a fully translated position.

4. The device of claim 3, wherein the stop arrangement is partially defined by a slot formed in the first member.

5. The device of claim 4, wherein the stop arrangement further includes a set screw positioned to move along the slot formed in the first member, the set screw further being positioned to engage ends of the slot to limit movement between the non-translated position and the fully translated position.

6. The device of claim 1, wherein the installation device is configured to install a bearing on an engine.

7. The device of claim 1, wherein the installation device is configured to install a seal on the engine.

8. The device of claim 1, further including an installer piece selectively mountable to an end of the second member, the installer piece being configured to contact and install an engine component.

9. The device of claim 8, wherein the installer piece is a first installer piece, the device further including a second installer piece that is selectively interchangeable with the first installer piece.

10. The device of claim 1, wherein the first member includes a threaded connection configured to couple to a crankshaft of the engine.

11. The device of claim 1, wherein the second member includes a housing having a central bore, the first member being positioned within the central bore of the housing.

12. The device of claim 11, wherein the housing includes a first housing portion and a second housing portion, the first housing portion defining the central bore.

13. The device of claim 12, wherein the second housing portion defines a second bore extending in a direction generally perpendicular to the central bore of the first housing portion.

14. The device of claim 13, wherein the second bore of the second housing portion extends into the central bore of the first housing portion.

15. The device of claim 12, wherein the rack and pinion arrangement includes a rack interconnected to the first member and a pinion gear positioned within the second housing portion of the housing, the pinion gear being configured to engage the rack to provide linear translation of the second member relative to the first member upon rotation of the pinion gear.

* * * * *